(12) United States Patent
Refaat et al.

(10) Patent No.: US 11,586,931 B2
(45) Date of Patent: Feb. 21, 2023

(54) TRAINING TRAJECTORY SCORING NEURAL NETWORKS TO ACCURATELY ASSIGN SCORES

(71) Applicant: Waymo LLC, Mountain View, CA (US)

(72) Inventors: Khaled Refaat, Mountain View, CA (US); Kai Ding, Santa Clara, CA (US); Stephane Ross, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 551 days.

(21) Appl. No.: 16/671,019

(22) Filed: Oct. 31, 2019

(65) Prior Publication Data

US 2021/0133582 A1 May 6, 2021

(51) Int. Cl.
*G06N 3/08* (2006.01)
*G06N 3/084* (2023.01)
*G06N 3/04* (2023.01)
*G05D 1/02* (2020.01)
*G05D 1/00* (2006.01)

(52) U.S. Cl.
CPC ........... *G06N 3/084* (2013.01); *G05D 1/0088* (2013.01); *G05D 1/0221* (2013.01); *G06N 3/0454* (2013.01); *G05D 2201/0213* (2013.01)

(58) Field of Classification Search
CPC .... G06N 3/084; G06N 3/0454; G05D 1/0088; G05D 1/0221; G05D 2201/0213
See application file for complete search history.

(56) References Cited

U.S. PATENT DOCUMENTS

| | | | | |
|---|---|---|---|---|
| 9,632,502 | B1* | 4/2017 | Levinson | H04L 41/0816 |
| 9,989,964 | B2* | 6/2018 | Berntorp | G05D 1/0212 |
| 10,013,773 | B1* | 7/2018 | Ogale | G06N 3/0454 |
| 11,157,768 | B1* | 10/2021 | Levinson | G06V 10/82 |

(Continued)

FOREIGN PATENT DOCUMENTS

| | | |
|---|---|---|
| CN | 108267123 | 7/2018 |
| KR | 101500168 | 3/2015 |

OTHER PUBLICATIONS

Seltzer et al. "Multi-task learning in deep neural networks for improved phoneme recognition," ICASSP, May 26, 2013, 5 pages.

(Continued)

*Primary Examiner* — Calvin Cheung
(74) *Attorney, Agent, or Firm* — Fish & Richardson P.C.

(57) ABSTRACT

Methods, systems, and apparatus, including computer programs encoded on a computer storage medium, for training a neural network having a plurality of sub neural networks to assign respective confidence scores to one or more candidate future trajectories for an agent. Each confidence score indicates a predicted likelihood that the agent will move along the corresponding candidate future trajectory in the future. In one aspect, a method includes using the first sub neural network to generate a training intermediate representation; using the second sub neural network to generate respective training confidence scores; using a trajectory generation neural network to generate a training trajectory generation output; computing a first loss and a second loss; and determining an update to the current values of the parameters of the first and second sub neural networks.

21 Claims, 6 Drawing Sheets

(56) References Cited

U.S. PATENT DOCUMENTS

| | | | |
|---|---|---|---|
| 11,195,418 B1* | 12/2021 | Hong | G06N 3/0445 |
| 11,260,852 B2* | 3/2022 | Rahimi | G06N 3/08 |
| 2017/0032035 A1 | 2/2017 | Gao et al. | |
| 2018/0124423 A1* | 5/2018 | Choi | H04N 19/52 |
| 2018/0157934 A1 | 6/2018 | Hu et al. | |
| 2018/0374359 A1 | 12/2018 | Li et al. | |
| 2019/0072973 A1* | 3/2019 | Sun | B62D 15/0265 |
| 2019/0147610 A1 | 5/2019 | Frossard et al. | |
| 2019/0294869 A1 | 9/2019 | Naphade et al. | |
| 2020/0151564 A1* | 5/2020 | Nakhaei Sarvedani | G06N 3/08 |
| 2020/0160559 A1* | 5/2020 | Urtasun | G06K 9/629 |
| 2020/0304835 A1* | 9/2020 | Liu | G06N 3/04 |
| 2020/0409378 A1* | 12/2020 | Benisch | G05D 1/0088 |
| 2021/0271254 A1* | 9/2021 | Chen | G05D 1/0088 |

OTHER PUBLICATIONS

Bock et al., "Self-learning Trajectory Prediction with Recurrent Neural Networks at Intelligent Intersections," Proceedings of the 3rd International Conference on Vehicle Technology and Intelligent Transport Systems, Apr. 2017, 1:346-351.

PCT International Search Report and Written Opinion in International Appln. No. PCT/US2020/058182, dated Feb. 18, 2021, 10 pages.

Rathmore et al., "A Scalable Framework for Trajectory Prediction," CoRR, Jun. 2018, arxiv.org/abs/1806.03582, 15 pages.

International Preliminary Report on Patentability in International Appln. No. PCT/US2020/058182, dated May 3, 2022, 6 pages.

* cited by examiner

TRAINING TRAJECTORY SCORING NEURAL NETWORKS TO ACCURATELY ASSIGN SCORES

BACKGROUND

This specification relates to autonomous vehicles.

Autonomous vehicles include self-driving cars, boats, and aircraft. Autonomous vehicles use a variety of on-board sensors and computer systems to detect nearby objects and use such detections to make control and navigation decisions.

SUMMARY

This specification describes a system implemented as computer programs for training a neural network having a plurality of sub neural networks that can be implemented onboard an autonomous vehicle to assign a respective confidence score to each of one or more candidate future trajectories that have been predicted for an agent. Each confidence score indicates a predicted likelihood that the agent will move along the corresponding candidate future trajectory.

In general, one innovative aspect of the subject matter described in this specification can be embodied in methods that include the actions of obtaining a training network input including (i) data characterizing a scene in an environment that includes an agent and (ii) data representing one or more candidate future trajectories of the agent; obtaining a ground truth output defining a ground truth future trajectory of the agent; processing, using the first sub neural network and in accordance with current values of the parameters of the first sub neural network, the training network input to generate a training intermediate representation; processing the training intermediate representation using the second sub neural network and in accordance with current values of the parameters of the second sub neural network, to generate respective training confidence scores for each of the one or more candidate future trajectories; processing the training intermediate representation using a trajectory generation neural network having a plurality of trajectory generation network parameters, wherein the trajectory generation neural network is configured to process the training intermediate representation in accordance with current values of the trajectory generation network parameters to generate a training trajectory generation output that defines a training predicted future trajectory for the agent; computing, for each of the one or more candidate future trajectories, a first loss based on (i) the training confidence score for the candidate future trajectory and (ii) a ground truth confidence score that indicates whether the candidate future trajectory matches the ground truth future trajectory; computing a second loss based on a difference between the training predicted future trajectory and the ground truth future trajectory; and determining, based on computing respective gradients of the first and second losses with respect to parameters of the first and second sub neural networks, an update to the current values of the parameters of the first and second sub neural networks.

In some implementations, determining an update to the current values of the parameters of the first and second sub neural networks includes: determining, based on computing a gradient of the first loss with respect to the second sub neural network parameters, an update to the current values of the parameters of the second sub neural network; and backpropagating the computed gradient of the first loss through the second sub neural network into the first sub neural network to determine the update to the parameter values of the first sub neural network.

In some implementations, the method further includes: determining, based on computing a gradient of the second loss with respect to the trajectory generation neural network parameters, an update to the current values of the parameters of the trajectory generation neural network.

In some implementations, the method further includes: backpropagating the computed gradient of the second loss through the trajectory generation neural network into the first sub neural network to determine the update to the parameter values of the first sub neural network.

In some implementations, the ground truth confidence score is equal to one if the candidate future trajectory matches the ground truth future trajectory and is equal to zero if the candidate future trajectory does not match the ground truth future trajectory.

In some implementations, the measure of difference is defined as a cross-entropy loss.

In some implementations, both the training predicted future trajectory and the ground truth future trajectory are represented as multi-dimensional arrays of data values, and wherein computing the second loss comprises determining a measure of difference between the two arrays.

In some implementations, the measure of difference is defined as an element-wise mean squared error loss.

In some implementations, the method further includes: providing the trained parameter values of the first and second sub neural networks for use in deploying, on a vehicle, a neural network that generates respective confidence scores for each of one or more candidate trajectories.

In some implementations, the deployed neural network is not configured to generate a trajectory generation output that defines a predicted future trajectory for an agent.

Particular embodiments of the subject matter described in this specification can be implemented so as to realize one or more of the following advantages.

Autonomous vehicles navigating through an environment may use a scoring model to assign respective confidence scores to the candidate future trajectories that have been predicted for any agents in a vicinity of the vehicle. The agents may be, for example, pedestrians, bicyclists, or other vehicles. Each respective confidence score refers to a likelihood that an agent will follow a particular candidate future trajectory. Timely and accurate planning decisions can then be generated based on the confidence scores in order to cause the vehicle to travel along a safe and comfortable trajectory.

However, training such scoring models to accurately assign confidence scores can be difficult. In other words, sometimes even after being trained for a long period of time, the scoring model might assign confidence scores that still do not accurately reflect the actual likelihoods that an agent will follow the corresponding candidate future trajectories. The training process has further issues. For example, because the loss function merely evaluates a difference between numeric values of the training and ground truth scores, the error signals, i.e., back-propagated gradients of the loss function, are not rich enough to fully update the respective values of model parameters. In particular, this issue can become problematic and inhibit successful training in cases where the model has an excessive number of parameters.

This specification, however, describes techniques for training a scoring model that overcome the problems mentioned above. In particular, the scoring model is implemented as a neural network. The scoring neural network and another neural network are jointly trained to perform multiple tasks, including generating an intermediate representation of the network input, assigning confidence scores, and predicting a future trajectory for an agent that is defined in the network input. During training, this technique provides the scoring neural network with richer training signals that come from the related task of predicting a future trajectory for the agent, therefore allowing the scoring neural network to learn to generate a rich and robust intermediate representation of the network input. Such intermediate representation further enables the scoring neural network to better perform related tasks that share this intermediate representation, including assigning respective confidence scores to candidate future trajectories. In this manner, the disclosed technique can lead to improved prediction accuracy and training efficiency of the scoring neural network.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how to train a neural network that can be implemented onboard an autonomous vehicle to assign a respective confidence score to each of one or more candidate future trajectories that have been predicted for an agent. Each confidence score indicates a predicted likelihood that the agent will move along the corresponding candidate future trajectory in the future. To enable the neural network to accurately assign respective confidence scores, during training, a training engine trains the neural network, or more precisely, the sub neural networks that are included in the neural network to jointly perform multiple tasks. Accordingly, the training engine updates the parameter values of the neural network based on respective performances of the sub neural networks on these tasks, therefore providing the neural network with richer training signals which lead to a higher-quality training process. These features and other features are described in more detail below.

Figure 1:
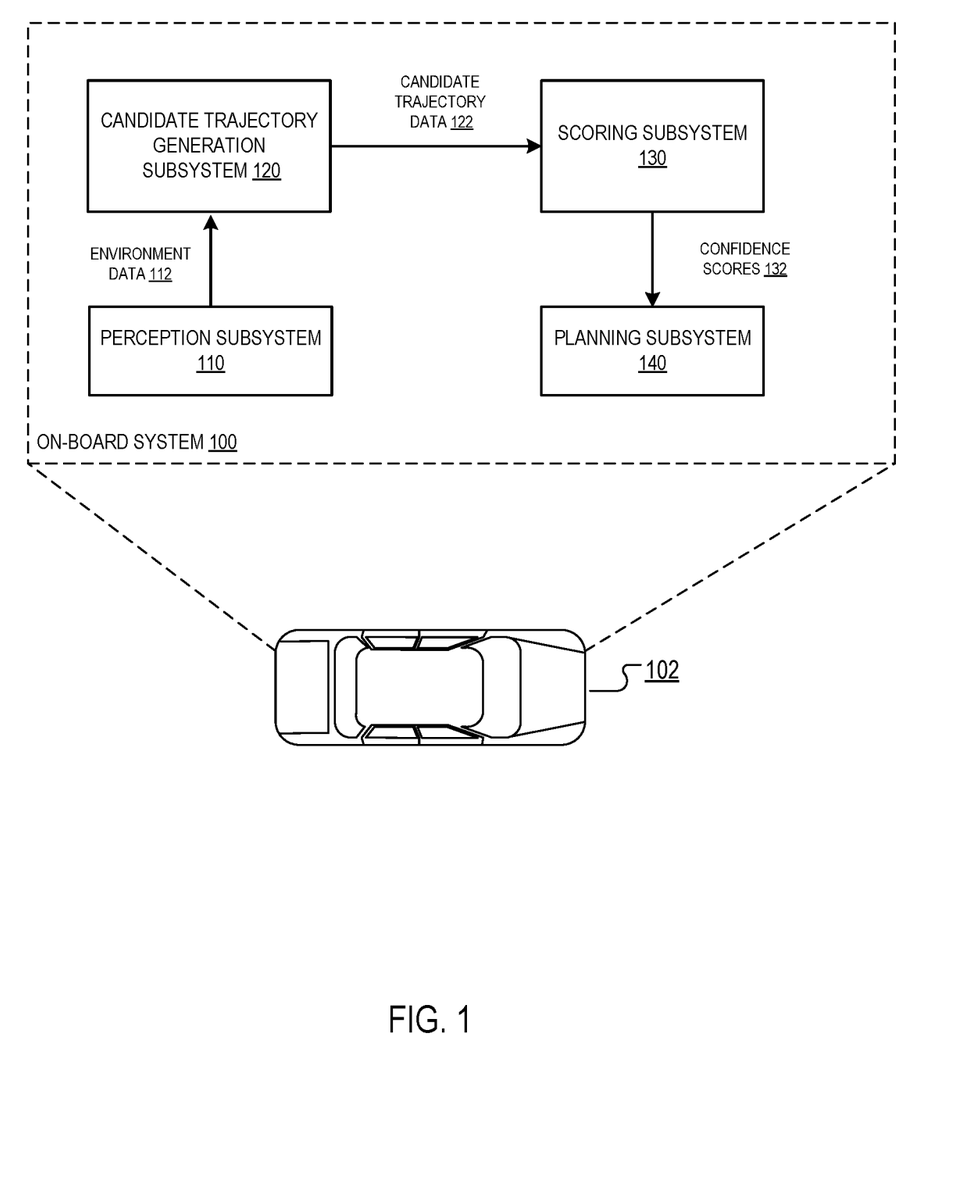
FIG. 1 is a block diagram of an example on-board system.

FIG. 1 is a block diagram of an example on-board system 100. The on-board system 100 is composed of hardware and software components, some or all of which are physically located on-board a vehicle 102. In some cases, the on-board system 100 can generate planning decisions which plan the future trajectory of the vehicle 102, present information to the driver of the vehicle 102 to assist the driver in operating the vehicle safely, or both. For example, in response to determining that the trajectory of another vehicle is likely to cross the trajectory of the vehicle 102, the on-board system 100 may generate planning decisions which adjust the future trajectory of the vehicle 102 to avoid a collision (e.g., by braking). As another example, in response to determining that the trajectory of another vehicle is likely to cross the trajectory of the vehicle 102, the on-board system 100 may present an alert message which prompts the driver of the vehicle 102 to adjust the trajectory of the vehicle 102 to avoid a collision.

Although the vehicle 102 in FIG. 1 is depicted as an automobile, and the examples in this specification are described with reference to automobiles, in general the vehicle 102 can be any kind of vehicle. For example, besides an automobile, the vehicle 102 can be a watercraft or an aircraft. Moreover, the on-board system 100 can include components additional to those depicted in FIG. 1 (e.g., a collision detection system or a navigation system).

The on-board system 100 includes a perception subsystem 110 which enables the on-board system 100 to "see" the environment in the vicinity of the vehicle 102. More specifically, the perception subsystem 110 includes one or more sensors, some of which are configured to receive reflections of electromagnetic radiation from the environment in the vicinity of the vehicle 102. For example, the perception subsystem 110 can include one or more laser sensors (e.g., LIDAR sensors) that are configured to detect reflections of laser light. As another example, the perception subsystem 110 can include one or more radar sensors that are configured to detect reflections of radio waves. As another example, the perception subsystem 110 can include one or more camera sensors that are configured to detect reflections of visible light.

The perception subsystem 110 repeatedly (i.e., at each of multiple time points) captures raw sensor data which can indicate the directions, intensities, and distances travelled by reflected radiation. For example, a sensor in the perception subsystem 110 can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in angle, azimuth, or both. Sweeping in azimuth, for example, can allow a sensor to detect multiple objects along the same line of sight.

The on-board system 100 can use the raw sensor data that is continually generated by the perception subsystem 110 to continually generate environment data 112 that characterizes a scene of an environment in a vicinity of the vehicle 102 at a current time point. In particular, the environment data 112 includes data that describes any agents that are present in the vicinity of the vehicle 102. The agents may be, for example, pedestrians, bicyclists, or other vehicles.

In some implementations, each environment data 112 includes respective representations of the trajectories of the agents up to a current time point. The trajectory of an agent refers to data defining, for each of multiple time points, the spatial position occupied by the agent in the environment at the time point and characteristics of the motion of the agent at the time point. The characteristics of the motion of an agent at a time point can include, for example, the velocity of the agent (e.g., measured in miles per hour-mph), the acceleration of the agent (e.g., measured in feet per second squared), and the heading of the agent (e.g., measured in degrees). The heading of an agent refers to the orientation of the agent and can be expressed as angular data (e.g., in the range 0 degrees to 360 degrees) which is defined relative to a given frame of reference in the environment (e.g., a North-South-East-West frame of reference).

In such implementations, to represent the trajectory of an agent, the environment data 112 is composed of one or more "channels". The channels may include, for example, time channel and various motion parameter channels. Each channel is a two-dimensional (2D) array of data values that represents a "top-down" perspective of the environment in the vicinity of the vehicle. Each position in each channel corresponds to a respective spatial position in the environment and can be indexed by respective coordinates. Each of the channels have the same dimensionality (i.e., the same number of rows and columns), the same top-down perspective of the environment, and are aligned (i.e., registered) with one another. That is, positions which are indexed by the same coordinates in different channels correspond to the same spatial position in the environment. In other words, corresponding positions in different channels correspond to the same spatial position in the environment.

Specifically, the time channel represents the respective time points at which the agent occupies different spatial positions in the environment in the previous trajectory of the agent. Each motion parameter channel represents the values of the respective motion parameter characterizing the motion of the agent when the agent occupies different spatial positions in the environment in the previous trajectory of the agent. In particular, for each spatial position in the environment which is occupied by the agent, the data value in the time channel which corresponds to the spatial position defines the time point at which the agent occupies the spatial position. Moreover, the data value in each respective motion parameter channel which corresponds to the spatial position defines the agent of the respective motion parameter characterizing the motion of the agent when the agent occupies the spatial position in the environment.

Generally, the environment may include multiple spatial positions which are not included in the trajectory of the agent. For these spatial positions, the system can set the data values in the time channel and the motion parameter channels which correspond to these spatial positions to a default value (e.g., the value 0).

The on-board system 100 can provide the environment data 112 to a candidate trajectory generation subsystem 120. The candidate trajectory generation subsystem 120 implements software that is configured to receive the environment data 112, data derived from the environment data 112, or both and repeatedly (i.e., at each of multiple time points) generate candidate trajectory data 122 that includes one or more candidate future trajectories for each of some or all of the multiple agents in the vicinity of the vehicle 102. Each candidate future trajectory defines a possible path in the environment along which the agent will travel within a certain period of time in the future, e.g., within the next 5 seconds after the current time point.

In some implementations, the on-board system 100 can provide the candidate trajectory data 122 generated by the candidate trajectory generation subsystem 120 to a planning subsystem 140.

When the planning system 110 receives the candidate trajectory data 122, the planning system 110 can use the candidate trajectory data 122 to generate planning decisions which plan the future trajectory of the vehicle 102. The planning decisions generated by the planning system 110 can include, for example: yielding (e.g., to pedestrians), stopping (e.g., at a "Stop" sign), passing other vehicles, adjusting vehicle lane position to accommodate a bicyclist, slowing down in a school or construction zone, merging (e.g., onto a highway), and parking.

For example, the planning decisions generated by the planning subsystem 140 can be provided to a control subsystem (not shown in the figure) of the vehicle 102. The control subsystem of the vehicle can control some or all of the operations of the vehicle by implementing the planning decisions generated by the planning subsystem. For example, in response to receiving a planning decision to apply the brakes of the vehicle, the control subsystem of the vehicle 102 may transmit an electronic signal to a braking control unit of the vehicle. In response to receiving the electronic signal, the braking control unit can mechanically apply the brakes of the vehicle.

To enable the planning subsystem 140 to generate proper and timely planning decisions, the on-board system 100 also provides the planning subsystem 140 with data identifying, for each of the multiple agents in the vicinity of the vehicle 102, how likely each of the one or more candidate future trajectories is to be followed by the agent. In some implementations, the system 100 provides such data along with the candidate trajectory data 122 to the planning subsystem 140.

The on-board system 100 determines corresponding likelihoods that the agent will follow the respective candidate future trajectories using a scoring subsystem 130. The scoring subsystem 130 is configured to generate a respective confidence score 132 for each candidate future trajectory using a scoring model. The scoring model can be implemented, for example, as a neural network model, a random forest model, a support vector machine (SVM) model, or as any other type of trainable machine learning model. In a particular example, the scoring subsystem 130 implements a scoring model that is configured as a neural network with multiple network layers.

The scoring neural network is configured to process an input that includes (i) data characterizing a scene in an environment in the vicinity of the vehicle 102 that includes an agent and (ii) data representing one or more candidate future trajectories of the agent in accordance with trained parameter values of the scoring neural network to generate an output that assigns a respective confidence score to each of the one or more candidate future trajectories. Each confidence score indicates a predicted likelihood that the agent will move along the corresponding candidate future trajectory. Techniques for training the neural network will be described in more detail below.

In fact, in some implementations, both the candidate trajectory generation subsystem 120 and the scoring subsystem 130 are part of another subsystem with more comprehensive configurations, e.g., an agent behavior prediction subsystem that is configured to generate prediction output which characterizes predicted future behavior of some or all of the agents in the vicinity of the vehicle 102.

After generating the confidence scores 132, for each agent, the on-board system 100 can determine one or more of the candidate future trajectories with the highest confidence scores to be the mostly likely future trajectories.

As a particular example, the scoring subsystem 130 receives candidate trajectory data 122 which includes data defining three candidate future trajectories for an oncoming sedan—the first is going straight forward without stopping, the second is stopping, and the third is turning left and crossing the trajectory of the vehicle 102. The scoring subsystem 130 processes the received candidate trajectory data 122 using the scoring neural network and in accordance with trained values of the network parameters to generate an output. The output defines respective confidence scores 132 for each of the three candidate future trajectories. In this particular example, the scoring neural network assigns a confidence score of 0.2 to the first trajectory, a confidence score of 0.3 to the second trajectory, and a confidence score of 0.5 to the third trajectory. Upon receiving the confidence scores 132, the on-board system 100 can determine that the oncoming sedan is most likely to make a left turn and cross the trajectory of the vehicle 102. Accordingly, the planning subsystem 140 can generate a planning decision to apply the brake of the vehicle 102 in order to avoid a collision.

Figure 2:
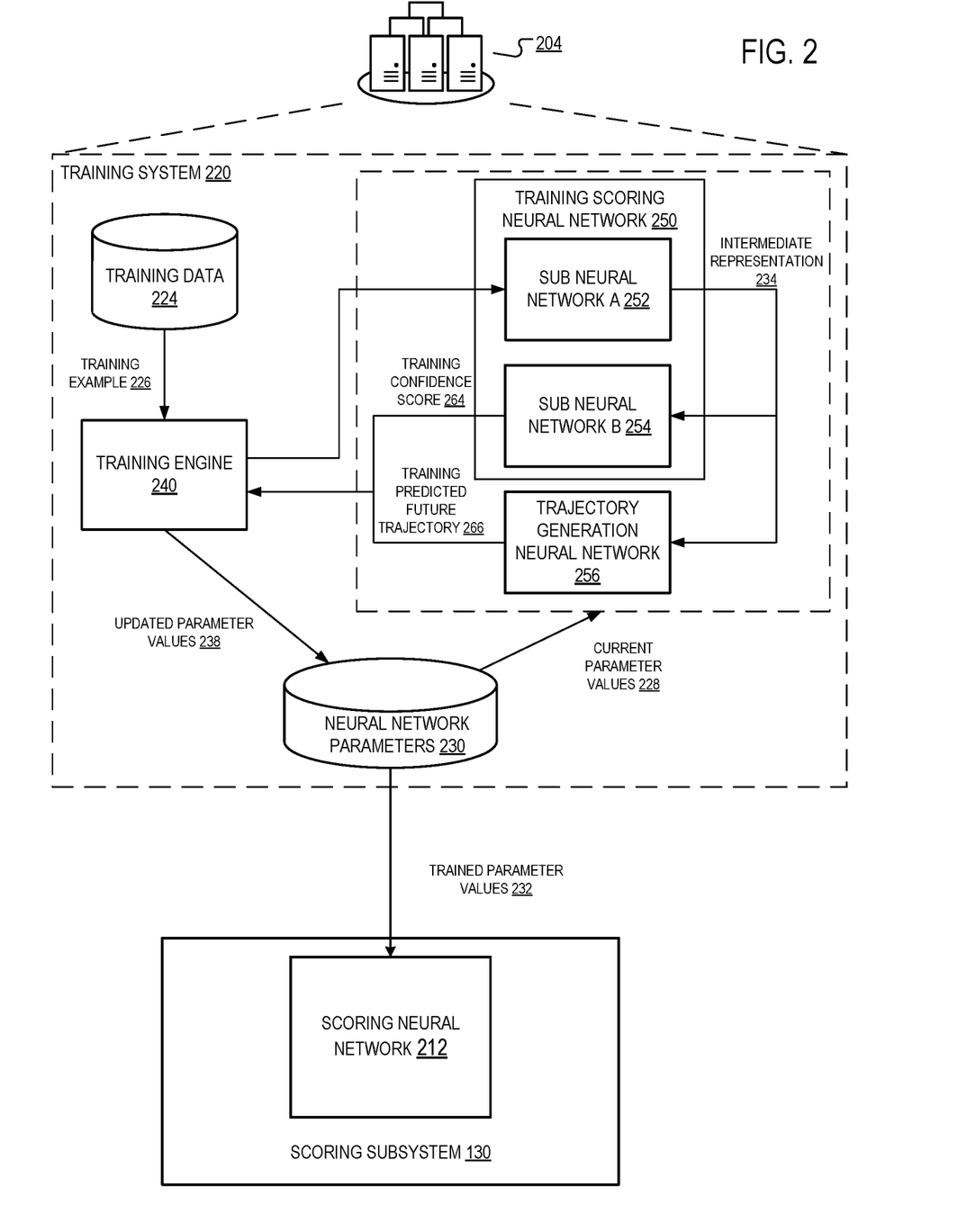
FIG. 2 is a block diagram of an example scoring subsystem and an example training system.

FIG. 2 is a block diagram of an example scoring subsystem 130 and an example training system 220. The scoring subsystem 130 and the training system 220 are examples of systems implemented as computer programs on one or more computers in one or more locations in which the systems, components, and techniques described below are implemented.

To allow the scoring subsystem 130 to accurately generate respective confidence scores for the candidate future trajectories, the training system 220 can determine trained parameter values 232 of the scoring neural network 212 included in the scoring subsystem 130. While the scoring subsystem 130 may be implemented on-board a vehicle as described above, the training system 220 is typically hosted within a data center 204, which can be a distributed computing system having hundreds or thousands of computers in one or more locations.

The training system 220 includes a training scoring neural network 250 which in turn includes sub neural networks 252-254. The training scoring neural network 250 is configured to process an input that includes (i) data characterizing a scene in an environment in a vicinity of the vehicle that includes an agent and (ii) data representing one or more candidate future trajectories of the agent, and to generate an output that assigns a respective training confidence score 264 to each of the one or more candidate future trajectories. In particular, each confidence score indicates a predicted likelihood that the agent will move along the corresponding candidate future trajectory. Typically, the training system 220 further includes a trajectory generation neural network 256 that is configured to generate a training trajectory generation output that defines a training predicted future trajectory 266. The predicted future trajectory is usually different from the one or more candidate future trajectories that are specified in the input. Each of the neural networks 252-256 in turn includes one or more neural network layers.

The training system 220 includes one or more computing devices having software or hardware modules that implement the operations of the training scoring neural network 250 and the trajectory generation neural network 256. For example, the training system 220 can include one or more computing devices having software or hardware modules that implement the respective operations of each layer of the training scoring neural network 250 according to an architecture of the training scoring neural network 250. In general, the training scoring neural network 250 has (at least partially) the same architecture as the on-board scoring neural network 212 included in the scoring subsystem 130.

At any given time during the training, the training system 220 can compute the operations of the training scoring neural network 250 and the trajectory generation neural network 256 using current values of parameters 228 stored in a collection of neural network parameters 230. Although illustrated as being logically separated, the neural network parameters 230 and the software or hardware modules performing the operations may actually be located on the same computing device or on the same memory device.

The training system 220 trains the training scoring neural network 250 and the trajectory generation neural network 256 using a training data set 224 which includes multiple training examples 226. Generating training examples 226 will be described in more detail below with respect to FIGS. 3-4.

Specifically, each of the training examples 226 may include a training input that includes (i) data characterizing a scene in an environment in a vicinity of the vehicle 102 that includes an agent and (ii) data representing one or more candidate future trajectories of the agent, and a ground truth output that defines a ground truth future trajectory of the agent. Both candidate and ground truth future trajectories defines paths of the agent after a given time point. In particular, each candidate future trajectory defines a possible path in the environment which the agent may follow after the given time point. The ground truth future trajectory defines the actual path that the agent actually did follow after the given time point.

In brief, for each training example 226, the sub neural networks 252-254 process the training input from the training example and generate a training output that includes respective training confidence scores 264. In addition, the trajectory generation neural network 256 processes an intermediate representation 234 that is generated by sub neural network A 252 and generates a training trajectory generation output that defines a training predicted future trajectory 266.

In particular, while the sub neural network A 252 and the sub neural network B 254 are both included in the training scoring neural network 250, the trajectory generation neural network 256 is separate from the network 250 and therefore is not included in the scoring neural network 212 to be deployed on-board the vehicle 102. In other words, once deployed onboard the vehicle 102, the scoring neural network 212 is not configured to generate a trajectory generation output that defines a predicted future trajectory for an agent. As will be explained in more detail below, the training system 220 uses the trajectory generation neural network 256 in order to improve the quality of the training process.

More specifically, the sub neural network A 252 is configured to process the training input and generate an intermediate representation 234 which is in the form of a fixed-size multi-dimensional array of data values. Typically, the intermediate representation 234 is the output of the last layer of the sub neural network A 252 or a combination of the outputs of multiple layers of the sub neural network A 252.

The sub neural network B 254 is configured to process the intermediate representation 234 to generate a training confidence score 264 for each candidate future trajectory. In general, each training confidence score 264 represents a predicted likelihood that the agent will follow the corresponding candidate future trajectory.

The trajectory generation neural network 256 is configured to process the same intermediate representation 234 to generate a training trajectory generation output that defines a training predicted future trajectory 266. For example, the training trajectory generation output can be a multi-dimensional array of data values (e.g., top-view image with fixed size) which depicts the geometry of the training predicted future trajectory 266.

The training system 220 also includes a training engine 240 which computes a value of a first loss function that evaluates a measure of difference between the training confidence scores 264 and the ground truth confidence scores that are derived from the ground truth future trajectory. In some implementations, for each candidate future trajectory, the ground truth confidence score is equal to one if the candidate future trajectory matches the ground truth future trajectory and is equal to zero if the candidate future trajectory does not match the ground truth future trajectory. For example, the first loss function may be a cross-entropy or logistic loss function that characterizes, for each candidate future trajectory, whether the corresponding training confidence score is consistent with the ground truth confidence score.

It should be noted that, exact match between the candidate and ground truth future trajectories is usually not required. In other words, a candidate future trajectory that is reasonably close to the ground truth future trajectory can be assigned a ground truth confidence score equal to one. Reasonably close is defined as, for example, when a geometric distance between two trajectories is below a predetermined threshold value.

The training engine 240 also computes a value of a second loss function that evaluates a measure of difference between the training predicted future trajectory 266 and the ground truth future trajectory. For example, in cases where both trajectories are represented as multi-dimensional arrays of data values, the second loss function may be an element-wise mean squared error loss function. The element-wise mean squared error loss is calculated between each data value from the multi-dimensional array representing training predicted future trajectory and each data value from the multi-dimensional array representing the ground truth future trajectory.

The training engine 240 computes respective gradients for the first and second loss functions and generates updated parameter values 238 by using an appropriate machine learning training technique (e.g., stochastic gradient descent). Specifically, the training engine 240 generates updated parameter values 238 for all three neural networks 252-256. The training engine 240 can then update the collection of neural network parameters 230 using the updated parameter values 238.

After training is complete, the training system 220 can provide a portion of trained parameter values 232 to the on-board system 100 for use in generating confidence scores that enable the generation of timely and accurate planning decisions by the planning subsystem 140. For example, the training system 220 provides, e.g., by a wired or wireless connection, the trained parameter values of the sub neural networks A and B 252-254 to the on-board system 100.

Figure 3:
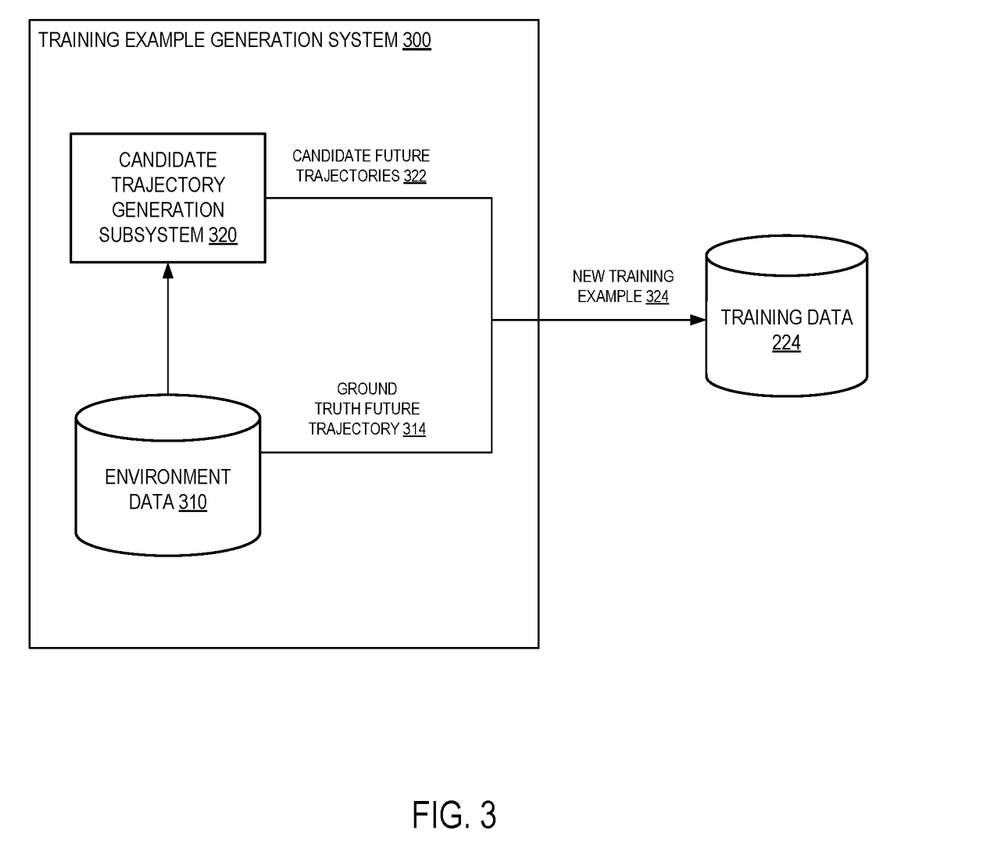
FIG. 3 is a block diagram of an example training example generation system.

FIG. 3 is a block diagram of an example training example generation system 300. The training example generation system 300 is an example of systems implemented as computer programs on one or more computers in one or more locations in which the systems, components, and techniques described below are implemented.

The training example generation system 300 maintains (e.g., in a physical data storage device) a set of environment data 310. The set of environment data 310 can be obtained, at least partially, from real or simulated driving logs.

A real driving log stores environment data 118 that is continually generated by the on-board system 100 of the vehicle 102 based on processing raw sensor data, as the vehicle navigates through real-world environments. As described with reference to FIG. 1, the raw sensor data may be generated by one or more sensors of the vehicle, including one or more of: laser sensors, radar sensors, and camera sensors.

A simulated driving log stores simulated environment data. Simulated environment data is generated based on a software simulation of the environment. That is, the simulated environment data simulates data that would be generated by the on-board system 100 based on processing raw sensor data.

Each environment data 310, whether real or simulated, characterizes a scene of an environment in a vicinity of the vehicle that includes one or more agents. In some implementations, the environment data includes respective representations of the trajectories, including candidate future trajectories, of the one or more agents.

In some implementations, the training example generation system 300 includes a candidate trajectory generation subsystem 320. The candidate trajectory generation subsystem 320 includes software that is configured to receive an environment data 310 and generate one or more candidate future trajectories 322 for each one of the agents that are present in the vicinity of the vehicle 102. In some implementations, the candidate trajectory generation subsystem 320 is the same candidate trajectory generation subsystem 120 included in the on-board system 100 of the vehicle 102. That is, both candidate trajectory generation subsystems 120 and 320 include the same software.

In general, for each agent, a candidate future trajectory 322 defines a possible path in the environment along which the agent will follow.

As will be described in more detail below with respect to FIG. 4, the system 300 generate new training examples 324 based at least on the candidate future trajectories 322 that are generated by the prediction subsystem 320. Specifically, each new training example 324 includes a training input that includes (i) data characterizing a scene in an environment in a vicinity of the vehicle 102 that includes an agent and (ii) data representing one or more candidate future trajectories of the agent, and a ground truth output that defines a ground truth future trajectory along which the agent travels. Optionally, the ground truth output further includes respective ground truth confidence scores for each of the one or more candidate future trajectories indicating whether the candidate future trajectory matches the ground truth future trajectory.

Although illustrated as being logically separated, the training example generation system 300 and the training system 220 may be located on the same computing device or on the same computing system, i.e., the data center 204. In some implementations, the training system 220 may actually include the training example generation system 300.

Figure 4:
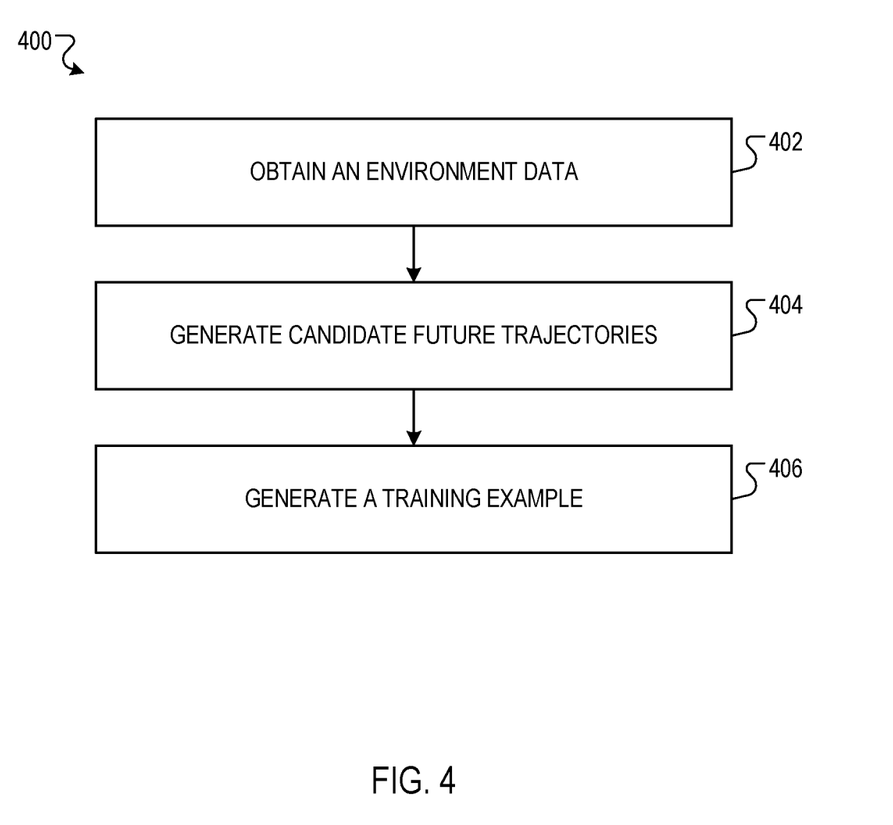
FIG. 4 is a flow diagram of an example process for generating a training example.

FIG. 4 is a flow diagram of an example process 400 for generating a training example. For convenience, the process 400 will be described as being performed by a system of one or more computers located in one or more locations. For example, a training data generation system, e.g., the training data generation system 300 of FIG. 3, appropriately programmed in accordance with this specification, can perform the process 400.

The system obtains an environment data (402) from real or simulated driving logs. The environment data characterizes a scene of an environment in which one or more agents that are present. In some implementations, the environment data includes respective representations of the trajectories, including candidate future trajectories, of the one or more agents.

In some implementations, the system can repeatedly perform the following steps 404 and 406 for each of the agents that are present in the environment.

The system generates one or more candidate future trajectories (404) for an agent that is present in the environment. The system can do so by using the candidate trajectory generation subsystem, by deriving the candidate future trajectories from the environment data, or both. A candidate future trajectory defines a possible path along which the agent can travel within a certain period of time after a particular time point. Typically, when generating new training examples, the particular time point corresponds to a time point in the past.

The system generates a new training example (406). Specifically, the new training example 324 includes a training input that includes: (i) data characterizing a scene in an environment in a vicinity of the vehicle 102 that includes the agent and (ii) data representing one or more candidate future trajectories of the agent, and a ground truth output that at least defines a ground truth future trajectory along which the agent travels. In general, the system derives the ground truth future trajectory from environment data. That is, the ground truth future trajectory is defined by the actual trajectory followed by the agent after the particular time point in the past.

Figure 5:
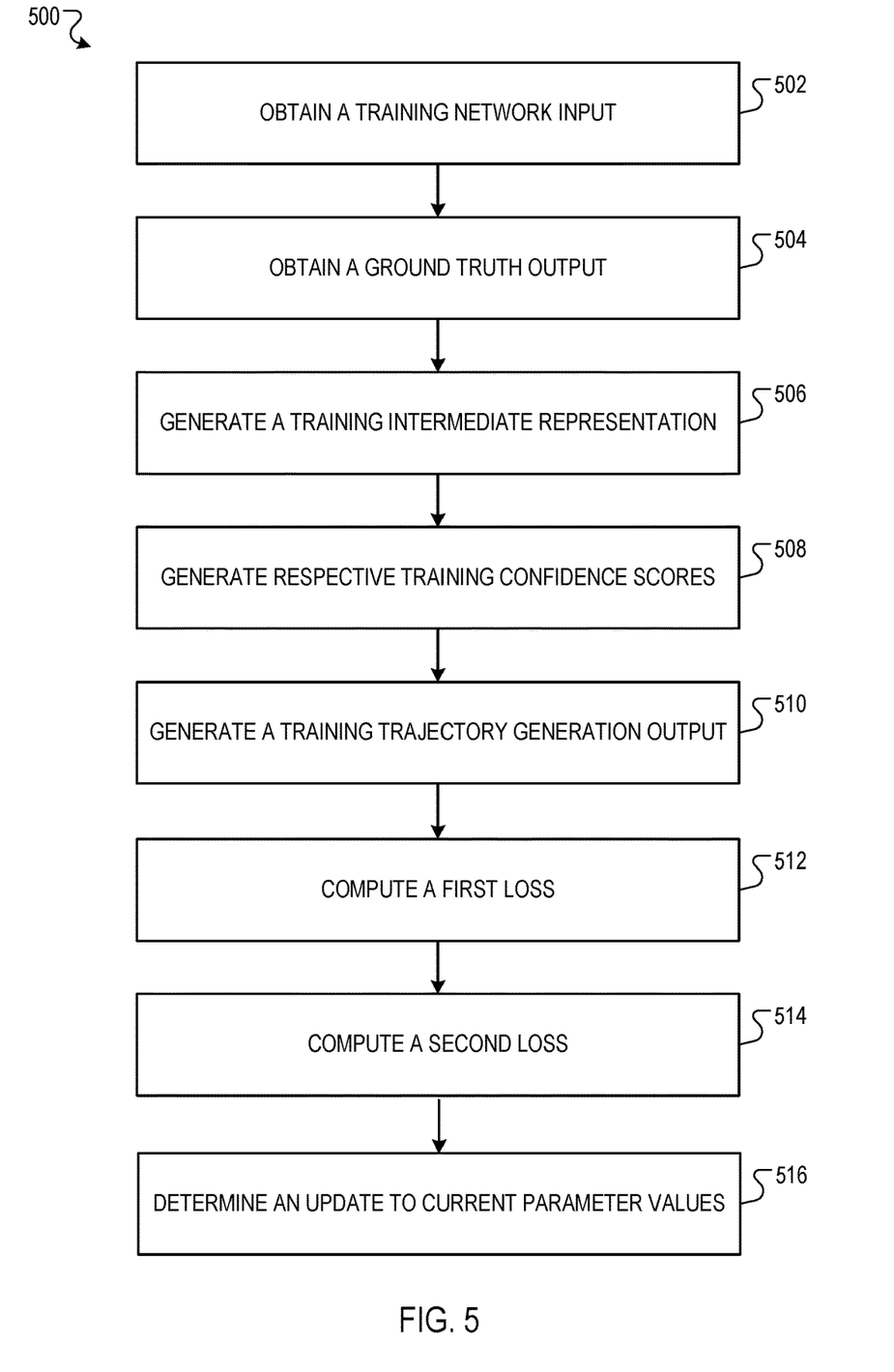
FIG. 5 is a flow diagram of an example process for training a scoring neural network.

FIG. 5 is a flow diagram of an example process 500 for training a scoring neural network. For convenience, the process 300 will be described as being performed by a system of one or more computers located in one or more locations. For example, a training system, e.g., the training system 220 of FIG. 2, appropriately programmed in accordance with this specification, can perform the process 500.

The system can repeatedly perform the process 500 for different training examples that each include a training input and a corresponding ground truth output in order to train the importance scoring subsystem by repeatedly updating the values of the network parameters.

The system obtains a training network input (502) that includes (i) data characterizing a scene in an environment in a vicinity of the vehicle that includes an agent and (ii) data representing one or more candidate future trajectories of the agent. Each candidate future trajectory defines a predicted path in the environment along which the agent is likely to follow.

The system obtains a ground truth output defining a ground truth future trajectory of the agent (504). The ground truth future trajectory defines the actual path that the agent actually did follow after a given time point.

The system generates a training intermediate representation (506) which is typically in the form of a fixed-size array of data values using the first sub neural network. Specifically, the system generates the training intermediate representation by processing the training network input in accordance with current parameter values of the first sub neural network. The system generates respective training confidence scores (508) for each of the one or more candidate future trajectories using the second sub neural network. Specifically, the system generates respective training confidence scores by processing the training intermediate representation in accordance with current parameter values of the second sub neural network. Each training confidence score corresponds to a predicted likelihood that the agent will follow the corresponding candidate future trajectory. For example, the system generates training confidence scores that each range from zero to one. In this example, for each candidate future trajectory defined by the training network input, a training confidence score that is close to one indicates that the agent is likely to follow the trajectory, while a score that is close to zero indicates that the agent is unlikely to follow the trajectory.

The system generates a training trajectory generation output (510) that defines a training predicted future trajectory for the agent using the trajectory generation neural network. Specifically, the system generates the training trajectory generation output by processing the training intermediate representation in accordance with current parameter values of the trajectory generation neural network. The predicted future trajectory defines a path that, as being predicted by the system, will be followed by the agent after the given time point. In addition, the predicted future trajectory may or may not match any one of the candidate future trajectories that are defined by the training network input.

The system computes a first loss (512) based on, for each of the one or more candidate future trajectories: (i) the training confidence score for the candidate future trajectory and (ii) a ground truth confidence score that indicates whether the candidate future trajectory matches the ground truth future trajectory. Typically, the ground truth confidence score is equal to one if the candidate future trajectory matches the ground truth future trajectory and is equal to zero if the candidate future trajectory does not match the ground truth future trajectory.

For example, the first loss may be computed using a cross-entropy or logistic loss function which characterizes, for each candidate future trajectory, whether the corresponding training confidence score is consistent with the ground truth confidence score.

The system computes a second loss (514) based on a measure of difference between the training predicted future trajectory and the ground truth future trajectory. For example, in cases where both trajectories are represented as multi-dimensional arrays of data values, the second loss may be computed using an element-wise mean squared error loss function.

The system determines an update to current parameter values (516) of the first and second sub neural networks. In some implementations, the system also determines an update to current parameter values of the trajectory generation neural network. Determining the update will be described in more detail below with respect to FIG. 6.

The system then proceeds to update the current parameter values of the neural network using an appropriate machine learning optimization technique (e.g., stochastic gradient descent). Alternatively, the system only proceeds to update the current parameter values once the process 500 has been performed for an entire mini-batch of training examples. A mini-batch generally includes a fixed number of training examples, e.g., 16, 64, or 256. In other words, the system combines respective updates that are determined during the fixed number of iterations of process 500 and proceeds to update the current parameter values based on the combined update.

Figure 6:
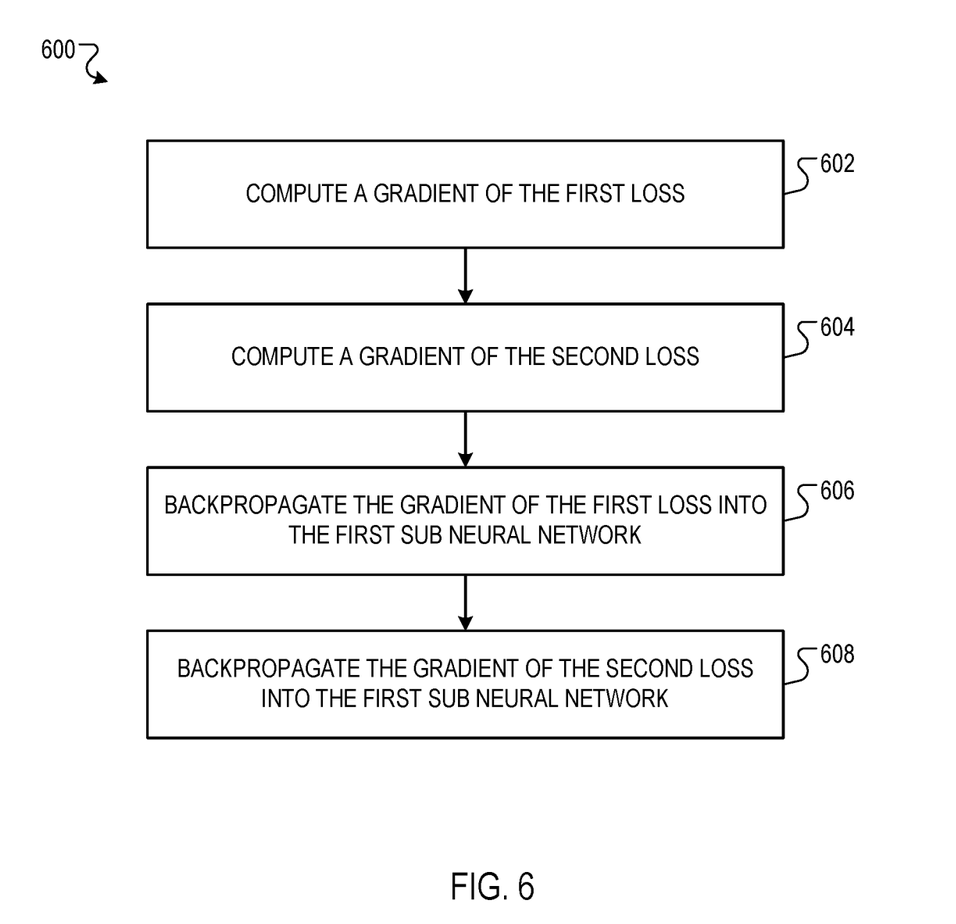
FIG. 6 is a flow diagram of an example process for determining an update to current parameter values.

FIG. 6 is a flow diagram of an example process 600 for determining an update to current parameter values. For convenience, the process 600 will be described as being performed by a system of one or more computers located in one or more locations. For example, a training system, e.g., the training system 220 of FIG. 2, appropriately programmed in accordance with this specification, can perform the process 600.

The system computes a gradient of the first loss (602) with respect to the parameters of the second sub neural network.

The system computes a gradient of the second loss (604) with respect to the parameters of the trajectory generation neural network.

The system backpropagates the computed gradient of the first loss through the second sub neural network into the first sub neural network (606) to determine the update to the parameter values of the first and second sub neural networks.

The system backpropagates the computed gradient of the second loss through the trajectory generation neural network into the first sub neural network (608) to determine the update to the parameter values of the first sub neural network and the trajectory generation neural network.

Optionally, the system also backpropagates the computed gradient of the second loss through the trajectory generation neural network into the second sub neural network to determine the update to the parameter values of the second sub neural network.

Further, in some implementations, the system dynamically adjusts respective amounts of the updates when performing steps 606-608. For example, the system can assign respective weights to the gradients of the first and second losses during different stages of the training process. A gradient that is assigned a greater weight typically results in more thorough updates to corresponding network parameter values.

Specifically, because gradients are additive, the system determines the update to parameter values of the first sub neural network based on a combination of the two backpropagated gradients. In this manner, for each training example, in addition to a difference between the numeric values of training and ground truth confidence scores, the update further captures a measure of difference between the predicted and the ground truth future trajectory for an agent and therefore incorporates richer error signals. In practice, during training, such richer error signals allow the first sub neural network to more accurately generate training intermediate representations, which further allows the second sub neural network to more precisely assign respective training confidence scores to the candidate future trajectories of an agent.

In general, simultaneously training these multiple neural networks on respective machine learning tasks can lead to improved performance for the task-specific neural networks, i.e., the two sub neural networks that are configured to respectively generate intermediate representations and confidence scores, when compared to training the neural networks separately. As a contrary example, if the system does not include the trajectory generation neural network and therefore only trains the first and second sub neural networks to generate confidence scores, the trained sub neural networks are likely to generate less accurate intermediate representations, and in turn, less precise confidence scores which does not fully reflect the actual likelihoods that an agent will follow the corresponding candidate future trajectories.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training a neural network having a plurality of network parameters and configured to receive a network input that includes (i) data characterizing a scene in an environment in a vicinity of a vehicle that includes an agent and (ii) data representing one or more candidate future trajectories of the agent, and to process the network input in accordance with the network parameters to generate a network output that assigns a respective confidence score to each of the one or more candidate future trajectories, wherein each confidence score indicates a predicted likelihood that the agent will move along the corresponding candidate future trajectory in the future, wherein the neural network includes a first sub neural network that processes the network input to generate an intermediate representation of the network input and a second sub neural network that processes the intermediate representation to generate the network output, the method comprising:

obtaining a training network input comprising (i) data characterizing a scene in an environment that includes an agent and (ii) data representing one or more candidate future trajectories of the agent;

obtaining a ground truth output defining a ground truth future trajectory of the agent; and training the neural network on the training network input, wherein the training comprises:

processing, using the first sub neural network and in accordance with current values of the parameters of the first sub neural network, the training network input to generate a training intermediate representation;

processing the training intermediate representation using the second sub neural network and in accordance with current values of the parameters of the second sub neural network to generate respective training confidence scores for each of the one or more candidate future trajectories;

processing the training intermediate representation using a trajectory generation neural network having a plurality of trajectory generation network parameters, wherein the trajectory generation neural network is configured to process the training intermediate representation in accordance with current values of the trajectory generation network parameters to generate a training trajectory generation output that defines a training predicted future trajectory for the agent;

computing, for each of the one or more candidate future trajectories, a first loss based on (i) the training confidence score for the candidate future trajectory and (ii) a ground truth confidence score that indicates whether the candidate future trajectory matches the ground truth future trajectory;

computing a second loss based on a difference between the training predicted future trajectory and the ground truth future trajectory; and determining, based on computing respective gradients of the first and second losses with respect to parameters of the first and second sub neural networks, an update to the current values of the parameters of the first and second sub neural networks.

2. The method of claim 1, wherein determining an update to the current values of the parameters of the first and second sub neural networks comprises:

determining, based on computing a gradient of the first loss with respect to the second sub neural network parameters, an update to the current values of the parameters of the second sub neural network; and backpropagating the computed gradient of the first loss through the second sub neural network into the first sub neural network to determine the update to the parameter values of the first sub neural network.

3. The method of claim 1, further comprising:

determining, based on computing a gradient of the second loss with respect to the trajectory generation neural network parameters, an update to the current values of the parameters of the trajectory generation neural network.

4. The method of claim 3, further comprising:

backpropagating the computed gradient of the second loss through the trajectory generation neural network into the first sub neural network to determine the update to the parameter values of the first sub neural network.

5. The method of claim 1, wherein the ground truth confidence score is equal to one if the candidate future trajectory matches the ground truth future trajectory and is equal to zero if the candidate future trajectory does not match the ground truth future trajectory.

6. The method of claim 5, wherein the measure of difference is defined as a cross-entropy loss.

7. The method of claim 1, wherein both the training predicted future trajectory and the ground truth future trajectory are represented as multi-dimensional arrays of data values, and wherein computing the second loss comprises determining a measure of difference between the two arrays.

8. The method of claim 7, wherein the measure of difference is defined as an element-wise mean squared error loss.

9. The method of claim 1, further comprising:

providing the trained parameter values of the first and second sub neural networks for use in deploying, on a vehicle, a neural network that generates respective confidence scores for each of one or more candidate trajectories.

10. The method of claim 9, wherein the deployed neural network is not configured to generate a trajectory generation output that defines a predicted future trajectory for an agent.

11. A system comprising:

one or more computers; and one or more storage devices storing instructions that, when executed by the one or more computers, cause the one or more computers to perform operations for training a neural network having a plurality of network parameters and configured to receive a network input that includes (i) data characterizing a scene in an environment in a vicinity of a vehicle that includes an agent and (ii) data representing one or more candidate future trajectories of the agent, and to process the network input in accordance with the network parameters to generate a network output that assigns a respective confidence score to each of the one or more candidate future trajectories, wherein each confidence score indicates a predicted likelihood that the agent will move along the corresponding candidate future trajectory in the future, wherein the neural network includes a first sub neural network that processes the network input to generate an intermediate representation of the network input and a second sub neural network that processes the intermediate representation to generate the network output, the operations comprising:

obtaining a training network input comprising (i) data characterizing a scene in an environment that includes an agent and (ii) data representing one or more candidate future trajectories of the agent;

obtaining a ground truth output defining a ground truth future trajectory of the agent; and training the neural network on the training network input, wherein the training comprises:

processing, using the first sub neural network and in accordance with current values of the parameters of the first sub neural network, the training network input to generate a training intermediate representation;

processing the training intermediate representation using the second sub neural network and in accordance with current values of the parameters of the second sub neural network to generate respective training confidence scores for each of the one or more candidate future trajectories;

processing the training intermediate representation using a trajectory generation neural network having a plurality of trajectory generation network parameters, wherein the trajectory generation neural network is configured to process the training intermediate representation in accordance with current values of the trajectory generation network parameters to generate a training trajectory generation output that defines a training predicted future trajectory for the agent;

computing, for each of the one or more candidate future trajectories, a first loss based on (i) the training confidence score for the candidate future trajectory and (ii) a ground truth confidence score that indicates whether the candidate future trajectory matches the ground truth future trajectory;

computing a second loss based on a difference between the training predicted future trajectory and the ground truth future trajectory; and determining, based on computing respective gradients of the first and second losses with respect to parameters of the first and second sub neural networks, an update to the current values of the parameters of the first and second sub neural networks.

12. The system of claim 11, wherein determining an update to the current values of the parameters of the first and second sub neural networks comprises:

determining, based on computing a gradient of the first loss with respect to the second sub neural network parameters, an update to the current values of the parameters of the second sub neural network; and backpropagating the computed gradient of the first loss through the second sub neural network into the first sub neural network to determine the update to the parameter values of the first sub neural network.

13. The system of claim 11, wherein the operations further comprise:

determining, based on computing a gradient of the second loss with respect to the trajectory generation neural network parameters, an update to the current values of the parameters of the trajectory generation neural network.

14. The system of claim 13, wherein the operations further comprise:

backpropagating the computed gradient of the second loss through the trajectory generation neural network into the first sub neural network to determine the update to the parameter values of the first sub neural network.

15. The system of claim 11, wherein the ground truth confidence score is equal to one if the candidate future trajectory matches the ground truth future trajectory and is equal to zero if the candidate future trajectory does not match the ground truth future trajectory.

16. The system of claim 15, wherein the measure of difference is defined as a cross-entropy loss.

17. The system of claim 11, wherein both the training predicted future trajectory and the ground truth future trajectory are represented as multi-dimensional arrays of data values, and wherein computing the second loss comprises determining a measure of difference between the two arrays.

18. The system of claim 17, wherein the measure of difference is defined as an element-wise mean squared error loss.

19. The system of claim 11, wherein the operations further comprise:

providing the trained parameter values of the first and second sub neural networks for use in deploying, on a vehicle, a neural network that generates respective confidence scores for each of one or more candidate trajectories.

20. The system of claim 19, wherein the deployed neural network is not configured to generate a trajectory generation output that defines a predicted future trajectory for an agent.

21. One or more non-transitory computer-readable storage media storing instructions that when executed by one or more computers cause the one or more computers to perform operations for training a neural network having a plurality of network parameters and configured to receive a network input that includes (i) data characterizing a scene in an environment in a vicinity of a vehicle that includes an agent and (ii) data representing one or more candidate future trajectories of the agent, and to process the network input in accordance with the network parameters to generate a network output that assigns a respective confidence score to each of the one or more candidate future trajectories, wherein each confidence score indicates a predicted likelihood that the agent will move along the corresponding candidate future trajectory in the future, wherein the neural network includes a first sub neural network that processes the network input to generate an intermediate representation of the network input and a second sub neural network that processes the intermediate representation to generate the network output, the operations comprising:

obtaining a training network input comprising (i) data characterizing a scene in an environment that includes an agent and (ii) data representing one or more candidate future trajectories of the agent;

obtaining a ground truth output defining a ground truth future trajectory of the agent; and training the neural network on the training network input, wherein the training comprises:

processing, using the first sub neural network and in accordance with current values of the parameters of the first sub neural network, the training network input to generate a training intermediate representation;

processing the training intermediate representation using the second sub neural network and in accordance with current values of the parameters of the second sub neural network to generate respective training confidence scores for each of the one or more candidate future trajectories;

processing the training intermediate representation using a trajectory generation neural network having a plurality of trajectory generation network parameters, wherein the trajectory generation neural network is configured to process the training intermediate representation in accordance with current values of the trajectory generation network parameters to generate a training trajectory generation output that defines a training predicted future trajectory for the agent;

computing, for each of the one or more candidate future trajectories, a first loss based on (i) the training confidence score for the candidate future trajectory and (ii) a ground truth confidence score that indicates whether the candidate future trajectory matches the ground truth future trajectory;

computing a second loss based on a difference between the training predicted future trajectory and the ground truth future trajectory; and determining, based on computing respective gradients of the first and second losses with respect to parameters of the first and second sub neural networks, an update to the current values of the parameters of the first and second sub neural networks.

\* \* \* \* \*